United States Patent [19]
Adams et al.

[11] Patent Number: 4,888,313
[45] Date of Patent: Dec. 19, 1989

[54] REFRACTORY CERAMICS FOR CONTACT WITH MOLTEN METAL

[75] Inventors: Richard W. Adams, Tewksbury, Mass.; Wen-Cheng J. Wei, Jamaica Plain, Mass.

[73] Assignee: Ceramics Process Systems Corporation, Milford, Mass.

[21] Appl. No.: 190,586

[22] Filed: May 5, 1988

[51] Int. Cl.[4] ............................................. C04B 35/48
[52] U.S. Cl. ................................... 501/103; 501/102; 501/106; 264/60
[58] Field of Search ....................... 501/102, 103, 106; 264/60

[56] References Cited

U.S. PATENT DOCUMENTS

| 2,553,265 | 5/1951 | Mochel | 501/106 |
| 3,620,781 | 11/1971 | Garvie | 501/104 |
| 3,972,722 | 8/1976 | Holt et al. | 501/105 |
| 4,067,745 | 1/1978 | Garvie et al. | 501/103 |
| 4,253,590 | 3/1981 | Holt et al. | 222/590 |
| 4,279,655 | 7/1981 | Garvie et al. | 501/103 |
| 4,510,191 | 4/1985 | Kagami et al. | 264/60 |
| 4,579,829 | 4/1986 | Garvie | 501/106 |
| 4,587,225 | 5/1986 | Tsukuma et al. | 501/105 |
| 4,615,953 | 10/1986 | Ichikawa et al. | 428/699 |
| 4,646,950 | 3/1987 | Gotoh et al. | 501/105 |

FOREIGN PATENT DOCUMENTS

| 0629199 | 9/1978 | U.S.S.R. | 501/103 |
| 0675035 | 7/1979 | U.S.S.R. | 501/106 |
| 0810647 | 3/1981 | U.S.S.R. | 501/103 |

OTHER PUBLICATIONS

Improved Thermal Shock Resistant Refractories from Plasma-Dissociated Zircon; C. Garvie; J. Mat. Sci., vol. 14, pp. 817–822 (1979).
Science and Technology of Zirconia II: Advances in Ceramics, vol. 12; N. Claussen, M. Ruhle, A. H. Heuer; Amer. Cer. Soc.
Composition and Microstructure of Dissociated Zircon Produced in a Plasma Furnace; A. M. Evans, J. P. H. Williamson; J. Mat. Sci., vol. 12, pp. 779–790 (1977).

Primary Examiner—William R. Dixon, Jr.
Assistant Examiner—Anthony J. Green
Attorney, Agent, or Firm—Bradley N. Ruben

[57] ABSTRACT

A refractory article and a process for making the same are provided. The article is derived from dissociated zircon and zirconia (99:1 to 80:20, weight basis). These components are formed into a slip, which can be conventionally processed to provide a sintered article. The resulting article can be subsequently heat treated to react any resulting glass phase with the zirconia present; further, the heat treated article can be subsequently redensified. These refractories are well-suited for such applications as tundish nozzle inserts and sliding gate valves.

11 Claims, 4 Drawing Sheets

REFRACTORY CERAMICS FOR CONTACT WITH MOLTEN METAL

BACKGROUND OF THE INVENTION

1. Field of the Invention.

This invention relates to a composition of matter useful as a fine grain refractory material, especially in applications for contact with molten metals in such particular devices as nozzles and gates, and to processes for producing the same. The refractory ceramics of the present invention exhibit excellent wear, thermal shock, and corrosion resistance in high temperature applications.

2. The State of the Art

The manufacture of iron and nickel alloys, particularly specialty steels, is a highly competitive industry. Procedures for reducing manufacturing costs and down times can lead to dramatic competitive advantages.

One general category of manufacturing is casting. This method typically involves the pouring and metering of a molten metal or alloy from a ladle into a tundish, which is a large holding area. Integral with the bottom of the tundish are a number of flow channels, or nozzles, through which the molten metal is carefully metered as it pours through to the casting mold. (Metering is intrinsically accomplished by having a molten metal under an essentially constant head flow through a constant diameter opening.) The flow rate through a single nozzle can be quite high, for example, ten tons of steel per minute. Accordingly, the ceramic refractories used in steel and other molten metal industries should not only possess high thermal shock, wear, and corrosion resistance, but should also prevent heat loss, oxidation of the molten stream, and uncontrolled flow. The refractory ceramic products must also be reliable and economical due to the cost competitiveness of the commodity metals industries. In particular, economical advantages should inure to the refractory products not only by providing such products at a reasonable cost, but the reliability and service life of such products dramatically effects the integration of the metal processing operation, such as down time versus continuous operating time, and thereby the economics of the processing operation.

Currently, the principal problems associated with refractory ceramic materials are wear and reliability. For example, a nozzle's key function is to precisely channel and meter molten materials. The nozzle wears as molten metal passes through it, and thus the bore changes dimension and shortens as the ceramic material is eroded from the bore and nozzle ends. When the wear progresses to a point such that the molten metal flow can no longer be metered with the requisite accuracy, the process is stopped and the nozzles are replaced. The need to frequently replace these key refractory components severely limits the efficiency of the processing operation.

A typical microstructure for a common tundish nozzle is shown in FIG. 1. The microstructure is characterized as a coarse agglomerate of "grog" grains which are cemented together with an inorganic, refractory cement; silica is commonly used as the refractory cement material. The porosity of such typical structures generally ranges from 13% to 30%, depending on the particular refractory application. The coarse grains and high porosity present in such a structure is due, in large part, to traditional engineering philosophies designed to protect the ceramic piece against thermal shock (typically the cool refractory is suddenly contacted with approximately 1600° C. molten metal). Unfortunately, this porosity results in poor wear and corrosion resistance; with increasing porosity, the number and area of contacts at which the large grog grains are cemented together is greatly decreased. This results in severe erosion as the molten metal, which is flowing at a high rate and under a large dynamic head, picks off grains from the nozzle bore surface. The low strength of such typical materials, inherent from their microstructure, also greatly contributes to chipping and cracking of the refractory ceramic prior to use. If such defects are not noted, this results in premature refractory failure, thereby further adding great expense and inefficiency to the steel making process. The penetration depth into and wetting of the molten metal onto the bore wall is also greatly increased with increasing porosity, often resulting in degradative chemical reactions between the refractory grains and the molten metal. For example, alumina-based refractories are subject to mullite formation when contacted with manganese/silicon low oxidative steels. As is commonly practiced in the steel industry, some steels are "killed" with aluminum to bind oxygen present in the steel. When such aluminum-killed steels, in which the steel contains precipitates of aluminum oxide, are poured through nozzles, the precipitates wet and cling to the nozzle bore, thereby clogging the bore and corroding the refractory material. The wetting and intercalating of the precipitates into the coarse grains can be temporarily delayed through pitch bonding (that is, the application to the bore of a non-wetting material), but such coatings are equally susceptible to degradation. Corrosion can also occur when the precipitates adhere to the bore wall, thereby causing restricted flow. Further, when the nozzle wears unevenly, the bore must be cleared with an oxygen lance; however, extremely high corrosion rates at the lanced section of the bore result, further leading to a shortened useful life. Corrosion resistance is generally minimized by the proper material selection; unfortunately, this selection is, by and large, an empirical art.

Ceramic refractory materials, such as used in the metal industries, are typically coarse grain, cement bonded, parts, and are typically composed of one or combinations of the following materials: alumina, magnesia, zirconia, zircon, mullite, silicon carbide, silicon nitride, pitch, graphite, and clay. In general, the chemical composition desired is determined through empirical methods to achieve the desired optimum properties regarding corrosion resistance, nozzle bore properties, wear, etc. For example, to combat nozzle clogging, Kagimi et al., U.S. Pat. No. 4,510,191, proposes a coarse grain bonded alumina refractory in which graphite is incorporated into the microstructure to create a slippery nozzle bore. That patent describes that while conventional zirconia and zircon refractories are resistant to erosion, the alumina precipitates nevertheless wet the ceramic and result in rapid clogging. A popular composition for many applications includes alumina-graphite refractories which are clay bonded, but again these are not very thermal shock resistant and are fragile and easily corroded, although they have a reduced tendency to clog due to the addition of graphite.

Typical coarse grain refractories used in the molten metal industries, such as for the channeling of metals, are described in Holt et al., U.S. Pat. Nos. 3,972,722 and 4,253,590, which describe two coarse grain compositions including alumina-zircon and magnesia, respectively. In these two patents, Holt et al. describe the use and benefits of a size distribution composed of 30–80% grog (4–70 mesh), 6–20% zircon (−74 microns) and 4–45% fines (−44 microns). Gotoh et al., in U.S. Pat. No. 4,646,950, describe the use of 30–60% coarse and medium particles (1–4 millimeters and 0.3–1.0 millimeters, respectively) and the balance composed of -0.3 millimeter fines, for alumina-zirconia-titania sliding nozzle plates.

Fine-grain zirconia and zircon ceramics have been recently described by several people, in the context of toughness for applications at less than about 1000° C.; accordingly, these descriptions provide little motivation to use such ceramics in the molten metal processing industry. Garvie et al. U.S. Pat. Nos. 4,279,655 and 4,067,745, discuss magnesium oxide and calcium oxide doped zirconia ceramics as PSZ (partially stabilized zirconia) ceramics for high strength and toughness at temperatures below 500° C. Garvie et al. also discuss a calcium oxide-zirconia composite for low temperature refractory application such as metal cutting and metal drawing. Tsukuma et al., in U.S. Pat. No. 4,587,255, discuss a fine grained yttria stabilized tetragonal zirconia polycrystal (TZP) ceramic that exhibits high strength and toughness for cool applications at temperatures less than about 1000° C. However, these materials are not very thermal shock resistant, nor are these fine-grain materials specified for a high temperature molten metal contact environment. Also, these TZP materials are expensive due to the fine nature of the powders and the cost of the yttria stabilizing agent. The processing of the PSZ materials described above requires special and expensive processing equipment to enable sintering in the 1700° C. to 1950° C. temperature range.

More recently, Garvie, in U.S. Pat. No. 4,579,829, describes zircon-zirconia refractories, wherein the zircon has a purity of at least 97% and the zirconia has a purity of at least 99%. In this patent, Garvie describes that dissociated zircon (DZ) has acceptable refractory characteristics, but cannot be processed in an aqueous environment (e.g., processed such as by slip casting) and thus Garvie utilizes a zircon-zirconia refractory because it is a less expensive and more easily processable substitute for a DZ ceramic.

SUMMARY OF THE INVENTION

Figure 1:
FIG. 1 is an SEM micrograph depicting the microstructure of a conventional coarse-grained refractory ceramic.

The present invention provides a fine-grain, controlled porosity, dissociated zircon-based (DZ) ceramic useful as a refractory material in contact with molten metals; the present invention also provides a fabrication process therefor. The present compositions and fabrication techniques therefore provide significant economic advantages over the PSZ and zircon-zirconia ceramics described by Garvie and the TZP ceramic described by Tsukuma. The performance of the present ceramics is superior to the PSZ and TZP ceramics at approximately 1200°–1800° C., and is vastly superior to the performance of the traditional coarse-grain refractories. Articles fabricated as described herein exhibit high thermal shock resistance and excellent wear and corrosion resistance when metering a wide variety of different grades of molten metals. Nozzles, sliding gate valves, and break rings are typical applications of articles produced by the present composition and application process.

The present invention provides refractory ceramic articles derived from dissociated zircon which includes from about 1 wt. % up to about 20 wt. % of zirconia. The articles produced from the present composition can be fabricated into complex shapes by injection molding techniques, they can be fabricated by traditional processes, such as isostatic pressing, or can be slip cast or tape cast into sheets for applications such as lining.

The present invention overcomes the deficiencies of prior art refractory ceramics by providing refractory articles which exhibit controlled porosity, a fine grain structure with an average grain size of less than about 10 microns, and a smooth surface having an average surface finish ($R_A$) of less than about 20 microinches. The material composition of the articles has a carefully tailored microstructure of zircon-zirconia. The asfired article can be heat treated after densification to alter the glass-to-crystalline phase ratio and to alter the porosity. The ceramic is processed in a controlled manner effective to provide a fine-grained microstructure that is resistant to thermal shock, wear, and corrosion in service. Additionally, the heat treated article can be redensified to further alter the desired characteristics.

DETAILED DESCRIPTION OF THE SPECIFIC EMBODIMENTS

The refractory ceramics of the present invention are derived primarily from dissociated zircon (alternatively referred to hereinafter as DZ). The production of dissociated zircon is described in a number of reference, including A. M. Evans and J. P. H. Williamson, "Composition and microstructure of dissociated zircon produced in a plasma furnace," *Journal of Materials Science*, volume 12, pages 779–790 (1977), and R. C. Garvie, "Improved thermal shock resistant refractories from plasma-dissociated zircon," *Journal of Materials Science*, volume 14, pages 817–822 (1979), both of which are incorporated by reference herein. In general, as described by Garvie, dissociated zircon can be formed by dropping grains of zircon sand through a plasma surface. The resultant product comprises spheres of reactive silica in which crystals of zirconia are embedded; the spheroids have a diameter of about 25–250 microns, the silica is amorphous, and the zirconia is present primarily in a monoclinic form. A detailed account of the characterization of dissociated zircon is provided in the Evans and Williamson article noted above. Dissociated zircon is commercially available under the trade designation DZ 910 from Z-TECH Company, Bow, N.H.

The dissociated zircon available as DZ 910 has a mean particle diameter of 110 microns, and, in practicing the present invention, is first comminuted by ball milling the powder in an aqueous suspension to an average mean particle diameter of about 2 microns. The analogous preparation of other DZ powders is within the ability of one of ordinary skill in the art. It is preferred that the dissociated zircon powder has mean particle sizes within the range from about 0.2 micron to about 5 microns, wherein the particle size distribution preferably has a standard deviation of from about 35% to about 85% of the mean particle size, most preferably about 55–65%, with the largest particles below 10 microns. The milled powder preferably has a specific surface area of about 6 $m^2/g$ (single point BET), although the surface area can generally range from about 2 $m^2/g$ to about 15 $m^2/g$.

The DZ milled powder is mixed with a zirconia powder, such as that available under the trade designation MEL S-grade from Magnesium Elektron, Flemington, NJ. The zirconia powder preferably has particles in the range of from about 0.5 to 10 microns, and the S-grade zirconia powder generally includes zirconia particles having a size range of about 3–4 microns which form agglomerates in the size range of about 5–50 microns, generally about 15–25 microns. The monoclinic zirconia agglomerates are present in the composition to improve the thermal shock resistance of the densified article. It is also important to note that this zirconia is neither stabilized nor partially stabilized; that is, the present invention contemplates the use of completely unstabilized zirconia, although a skilled artisan may find it desirable to use stabilized or partially zirconia.

The DZ powder and the zirconia powder are mixed together such that the zirconia comprises from about 1% to about 20% by weight of the mixed powder formulation, preferably about 5–15%, most preferably 10%±1%. A particular composite composition is conventionally designated by the weight fraction of zirconia; thus, DZ-10 is a composite including about 10 wt. % zirconia.

The resulting mixed powder formulation is preferably provided as a highly loaded slurry, that is, having at least about 45 vol. % solids, as described in co-pending U.S. patent application Ser. No. 045,684, filed May 1, 1987, which is herein incorporated by reference; slips having more than 58 vol. % solids and exhibiting little or no dilatancy have been prepared in practicing the present invention. This slurry can be based on an organic solvent medium or an aqueous medium, the latter of which is surprising in view of the statement in the Garvie U.S. Pat. No. 4,579,829 that a DZ-zirconia powder mixture cannot be formed into an aqueous slip due to flocculation problems. An organic binder, and optionally a plasticizer therefor, can be added to the slip to facilitate more precise casting, as described in co-pending U.S. patent application Ser. No. 36,085, filed Apr. 9, 1987, or the slip can be injection molded under low pressure (e.g., less than about 200 psi), as described in applicant's co-pending U.S. patent application Ser. No. 34,100, filed Apr. 1, 1987, both of which applications are herein incorporated by reference. Alternatively, the slurry can be molded by injecting the slurry into a mold and subsequently removing the solvent medium by sublimative drying as described in co-pending U.S. patent application Ser. No. 125,643, filed Nov. 25, 1987, incorporated by reference herein; alternatively, the solvent can be non-aqueous and removed by sublimative drying as described in co-pending U.S. patent application Ser. No. 180,092, filed Apr. 11, 1988 also incorporated herein by reference. The sublimative drying technique obviates the need for a polymeric binder, which must be removed prior to densification. The slurry may also be tape cast as described in co-pending U.S. patent applications Ser. Nos. 085,951, filed Aug. 13, 1987, and 34,099, filed Apr. 1, 1987, both of which are incorporated by reference herein.

A typical slip includes about 53.5 vol. % solids, of which about 90 wt. % is DZ and about 10 wt. % of which is zirconia. The remainder of the slip is essentially vehicle, of which about 0.5–5 wt. % is a dispersant (e.g., NARLEX LD-45, a polymeric polyelectrolytic acrylate copolymer having ammonium moieties, available from National Starch and Chemical Corp., Bridgewater, N.J.). A preferred production method is that described in the aforementioned 125,643 application, in which case the slip is aqueous includes about 2 wt. % dispersant and about 5 wt. % dimethyl sulfoxide as a cryoprotectant. These slips have a viscosity of less than about 1000 cP at 20–140 $s^{-1}$. In general, the vehicle may be any substance that is chemically inert with respect to the ceramic components.

The green article typically has a density of about 45% theoretical, and can be sintered in the span of about one hour at a temperature of about 1700° C. The green article is densified by sintering at a temperature of greater than the 1676° C. dissociation temperature and also greater than the 1687° C. eutectic temperature (for a DZ-10 system) under controlled conditions. Sintering temperatures are preferably above 1700° C., most preferably at about 1710° C. for one hour. In fact, sintering temperatures much below 1700° C. do not readily produce a high density article. Applicants have, as taught by Garvie, sintered at 1500° C. for 5 hours, which resulted in an article having an apparent porosity of 38.7 vol. % and a relative XRD ratio of zircon:zirconia of about 7.8; applicants have also slip cast a part and sintered under the same conditions (1500° C., 5 hours) to a porosity of about 20%. Thus, although a significant increase in the zircon content is realized under these conditions, densification was minimal.

An exemplary sintered article derived from a DZ-10 system is composed of a 3 phase system including about 7.7 wt. % (about 23.1 vol. %) of a silica glass phase, about 69 wt. % (about 52 vol. %) zircon, and about 23.1 wt. % (about 30.3 vol. %) zirconia. The zircon is present as grains of about 2–3 microns in diameter. The zirconia is present as agglomerate structures of approximately 12 microns in diameter composed of grains of about 3 microns, and is also present as dispersed single grains of an average size of about 3 microns. The relative ratio of zircon to zirconia was calculated from the zircon (200) XRD (x-ray diffraction) peak and the (111) diffraction peak for monoclinic zirconia. Phase composition was measured from SEM micrographs by taking advantage of differences in contrast; which yielded the weight and volume fractions just mentioned. The total porosity was determined by an SEM micrograph at 2–3% and open porosity was determined by the Archimedes method to be less than about 1%.

The as-fired articles are suitable for refractory use, and have been tested as tundish nozzle inserts. In the following two examples of the unexpectedly long duration of the present refractories, "heat" is an art-recognized term referring to 150 tons of steel; thus, the total number of heats × 150 indicates the number of tons of steel that the nozzle insert has withstood.

EXAMPLE 1

A tundish nozzle insert made in accordance with the present invention was employed in service as follows:

| Heats | Steel Type |
|---|---|
| 3 | 60 |
| 1 | 60A-36 |
| 3 | 60 |
| 3 | 40 |
| 1 | 4623M |
| 1 | 8620 |
| 1 | 8637 |
| 2 | E438CF |
| 3 | 8650HCF |
| 1 | 1138C |
| 1 | 1141CF |
| 1 | 1137C |

After a total of 21 heats (37 hours; 3150 tons), the nozzle insert had not failed and was functioning as it did at the first heat. This is an unexpectedly long service since conventional, coarse-grained nozzle inserts, as commonly used in the industry, failed after about 7-10 heats (1050-1500 tons).

EXAMPLE 2

Another nozzle insert was put into service similar to that of the foregoing example as follows:

| Heats | Steel Type |
|---|---|
| 1 | A588B |
| 1 | A572-50 |
| 5 | 1045 |
| 3 | M1042 |
| 3 | 1038 |
| 3 | 1037M |
| 1 | 1035 |
| 1 | 1030 |
| 3 | M1018 |
| 2 | A-36 |

This nozzle insert sustained 23 heats (45 hours, 25 minutes; 3450 tons) without failing.

It is important to note that in both of the foregoing examples, the nozzle insert did not fail, even at the final heat; rather, the testing was discontinued after the mill at which the nozzle inserts were being tested ran out of steel for the tundish.

Figure 2:
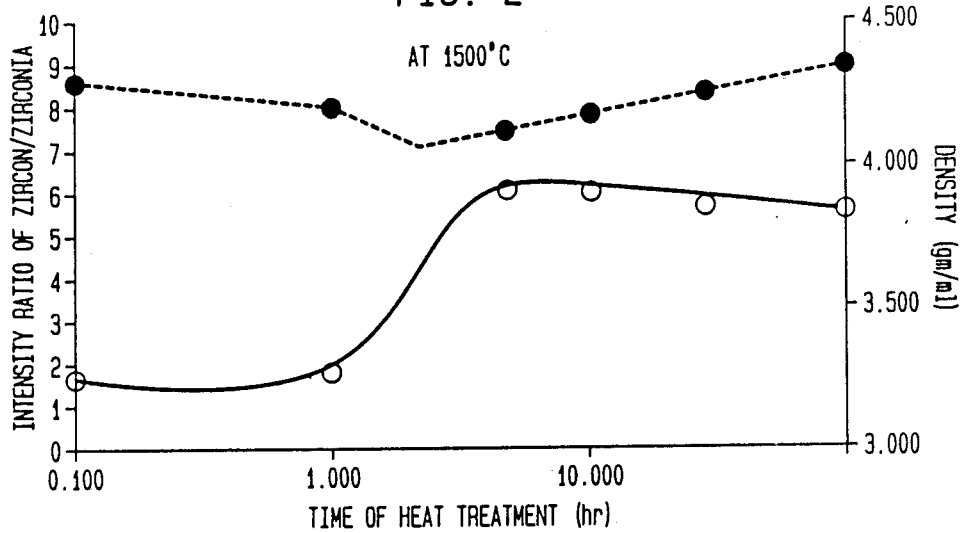
FIG. 2 depicts the ratio of zircon to zirconia and the density as a function of heat treatment time of a sintered article made according to the present invention.
Figure 3:
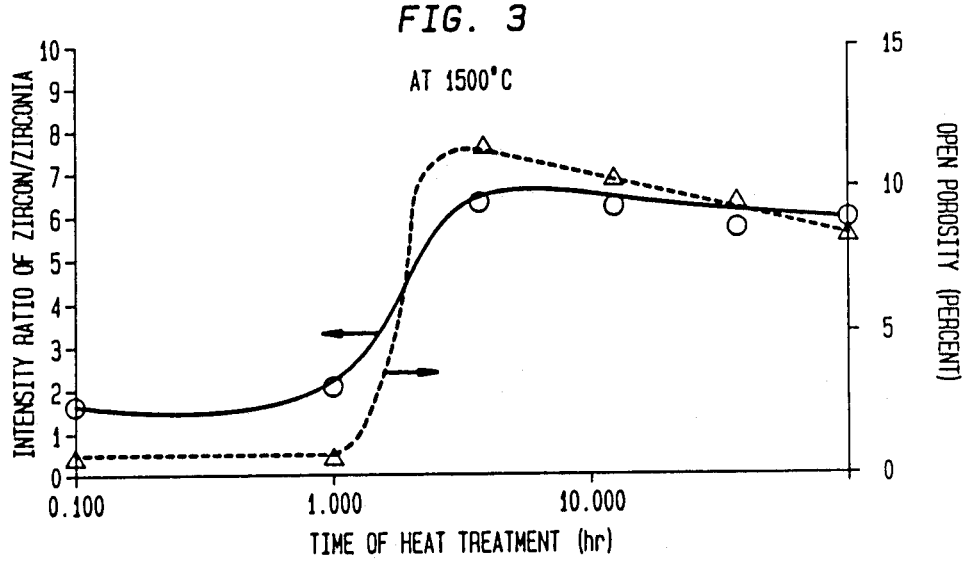
FIG. 3 depicts the open porosity (as well as the zircon to zirconia ratio as in FIG. 2) as a function of heat treatment time of a sintered article made according to the present invention.

An alternative embodiment for fabricating these novel refractories is to heat treat the sintered article, which is believed to cause the silica and zirconia to react and form zircon. Heat treating can be effected by heating the article to about 1400° C. to less than the dissociation temperature. Concomitant with the reaction of the silica, the article exhibits an increase in porosity. Some results of heat treating a sintered article are shown in FIGS. 2 and 3. Both of these figures show that after about one hour of heat treatment at 1500° C., the silica and zirconia start to react, as evidenced by the change in the relative zircon:zirconia ratio (determined by XRD intensity); the ratio of about 1.8 in the as-fired article changes to about 6 after approximately four hours of heat treatment. These Figures also show a decrease in the density of the article, from about 4.4 gm./ml. to about 4.15 gm./ml. after the same period of time. In part, this density change is manifest as open porosity, which changes from an as-fired value of about 0.5% to about 11% after the same period of time. These figures also depict the continuing effect on density and porosity after more prolonged periods of heat treatment. The heat treated articles exhibited a $K_{IC}$ of about 2.9 MPa.m$^{\frac{1}{2}}$, a mean strength of about 168 MPa (n=25, g=13.2), and a Weibull modulus of about 21 (strength and Weibull determined at room temperature).

In yet another embodiment of this invention, the heat treated article is subsequently densified, i.e., redensified. For example, nozzle inserts were heat treated at 1500° C. for four hours and then redensified (resintered) at 1660° C. for an additional four hours; it should be noted that this temperature is below the dissociation temperature of 1676° C., and redensification is preferably at a temperature from about 1600° C. up to less than the dissociation temperature (1676° C.). Those nozzles exhibited an open porosity of about 1.3% and a relative XRD intensity ratio of about 5.3. Of course, a decreased period for redensification would be expected to yield less of a reduction in porosity. Since redensification is at less than the dissociation temperature, it would be expected that the composition (e.g., relative ratio of zircon:zirconia) would remain relatively unchanged from the heat treated article; however, as the redensification temperature approaches the dissociation temperature, it would be expected that the composition would change to the direction of the equilibrium composition.

Figure 4:
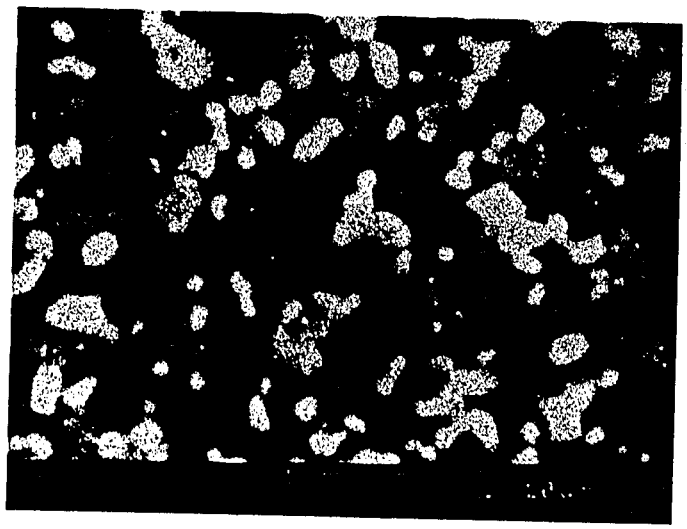
FIG. 4 is an SEM micrograph of a sintered article made in accordance with the present invention.
Figure 5:
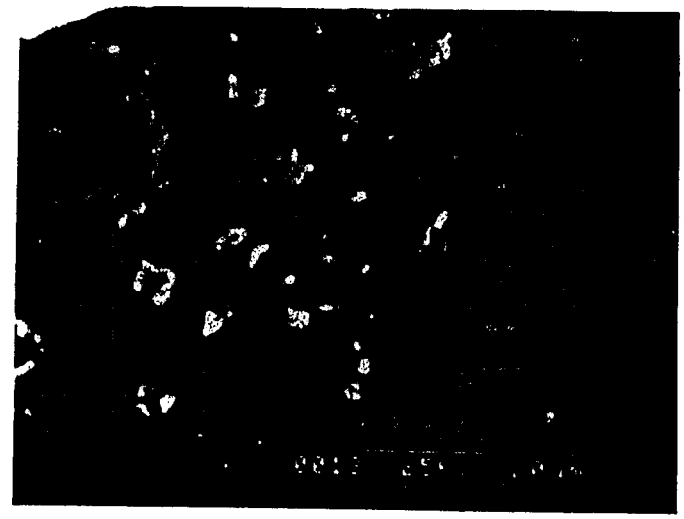
FIG. 5 is an SEM micrograph of an article made in accordance with the present invention by sintering, heat treating, and subsequent redensification.
Figure 6:
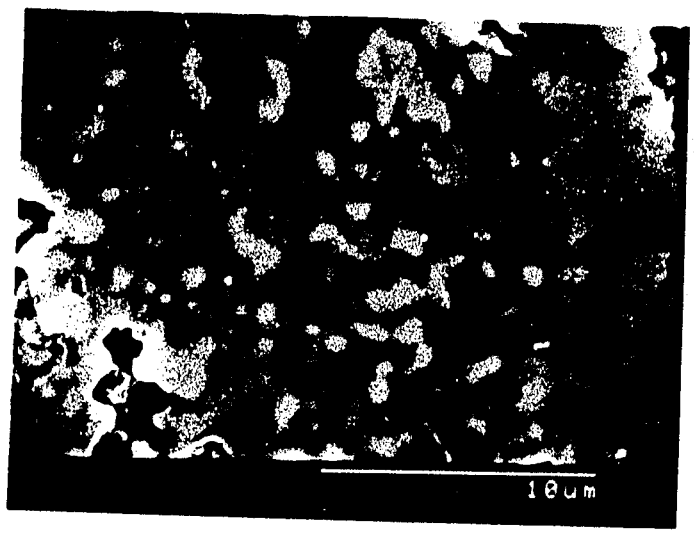
FIG. 6 is an SEM micrograph of an article made in accordance with the present invention which was heat treated to 1500° C for 1.5 hours.
Figure 7:
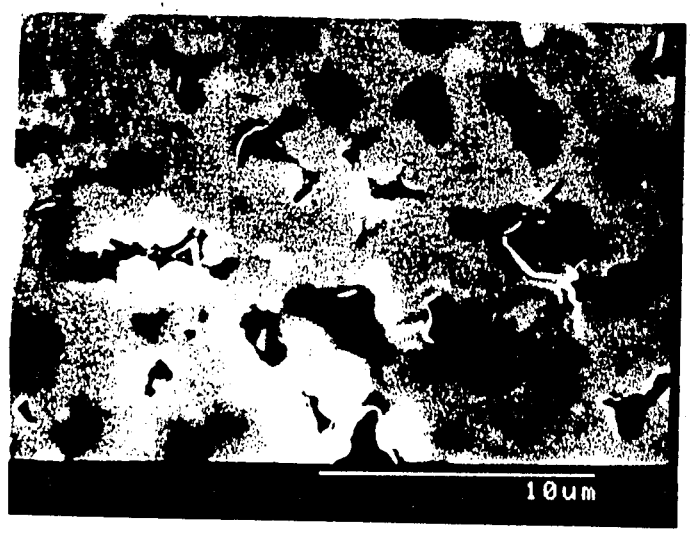
FIG. 7 is an SEM micrograph of an article made in accordance with the present invention which was heat treated to 1500° C. for 4 hours.

FIG. 4 is an SEM micrograph of a sintered article made in accordance with the present invention: the dark areas are the silica glass phase, the brightest areas are the zirconia phase, and the gray areas are the zircon phase. FIG. 6 is an SEM micrograph of an article than has been sintered at 1710° C. for 1 (one) hour and heat treated at 1500° C. for 1.5 hours. It can be seen in FIG. 6 that some of the zirconia grains (bright areas) are now engulfed by a gray layer; in essence, a reaction zone has resulted in a layer of zircon (gray) around the zirconia particles. FIG. 7 shows an article that has been heat treated at 1600° C. for 4 hours; it can be seen that much of the silica and zirconia phases have reacted to form zircon. FIG. 5 shows an article that was sintered at 1710° C. for 1 hour, heat treated at 1500 C for 4 hours, and redensified at 1660° C. for 4 hours; it can be seen that, as with FIG. 7, there is a large amount of Zircon having well-dispersed therein the silica and zirconia phases, although the porosity of the article in FIG. 5 is less than the articles which have been subjected only to heat treatment.

Among the molten metals the novel refractory ceramics of this invention are suitable for contact with include various types of steel. For example, carbon steel (such as those known by the designations 60, 60A36, 40, M1042, 1045, 1038, 1037M, 1035, 1030, M1018, and A-36), resulfurized steels (such as those under the designations 1137C, 1138C, and 1141CF), high strength structural steels (such as those known under the designations A-572-50 and A588B), molybdenum steels (such as that known under the designation 4047H), nickel molybdenum steels (such as that known under the designation 4623M), chromium molybdenum steels (such as that known under the designation 4142HM), and nickel-chromium-molybdenum steels (such as those known under the trade designations 8620, 8637, B438CF, 8650HCF, and 4325G).

The present invention has been described above with reference to specific embodiments. Various changes and modifications may be evident to an artisan upon reading the foregoing description, but such alterations are intended to be within the scope and spirit of the present invention as defined by the claims.

What is claimed is:

1. A process for making a refractory article, comprising:
   (a) providing a slip having a solids portion consisting essentially of (i) about 80–99 wt. % dissociated zircon and (ii) about 1–20 wt. % zirconia, the remainder of the slip including a vehicle and an amount of dispersant effective to disperse the solids portion in the vehicle;
   (b) introducing an amount of the slip into a mold of a desired geometry;
   (c) removing the vehicle form the slip to provide a green article; and
   (d) sintering the green article at a temperature greater than the eutectic temperature t form a fired article including a silica phase, a zircon phase, and a zirconia phase.

2. The process as defined by claim 1, wherein the slip has a viscosity of less than about 2000 cP at 100 s$^{-1}$.

3. The process as defined by claim 1, wherein the solids are present in an amount of at least about 45 vol. %.

4. The process as defined by claim 1, wherein removing the vehicle is accomplished by a subprocess including the steps of (i) solidifying the vehicle to produce a formed article and (ii) removing the solidified vehicle predominantly by sublimation to produce a green article.

5. The process as defined by claim 1, wherein the sintering temperature is greater than about 1700° C.

6. The process as defined by claim 1, wherein sintering is in an atmosphere including air.

7. The process as defined by claim 1, further comprising the step of (e) heat treating the fired article to provide a refractory article.

8. The process as defined by claim 7, wherein heat treating is at a temperature in the range of about 1400° C. to about 1676° C.

9. The process as defined by claim 7, wherein heat treating is effective to increase the porosity of the fired article by a ratio of from about 3:1 to about 25:1.

10. The process as defined by claim 7, further comprising the step of (f) redensifying the heat treated article.

11. The process as defined by claim 10, wherein redensification is at a temperature in the range of about 1600° C. to less than the dissociation temperature.

* * * * *

UNITED STATES PATENT AND TRADEMARK OFFICE
CERTIFICATE OF CORRECTION

PATENT NO. : 4,888,313

DATED : December 19, 1989

INVENTOR(S) : Richard W. Adams, et al

It is certified that error appears in the above-identified patent and that said Letters Patent is hereby corrected as shown below:

On the title page, Item [75] should be:

--Richard W. Adams, Marlboro, Mass.--

--Wen-Cheng Wei, Taipei, Taiwan--

Column 8, line 7, "g=13.5" should be --$\sigma$=13.2--

In the claim

Col. 9, claim 1, line 19, "t" should be --to--

Signed and Sealed this

Thirteenth Day of August, 1991

Attest:

HARRY F. MANBECK, JR.

Attesting Officer

Commissioner of Patents and Trademarks